(12) United States Patent
Houston

(10) Patent No.: US 6,445,086 B1
(45) Date of Patent: Sep. 3, 2002

(54) ELECTRONIC POWER SUPPLY FOR PERSONAL COMPUTER AND METHOD

(76) Inventor: David H. Houston, 221 Kenneth Rd., Glendale, CA (US) 90212

( * ) Notice: Subject to any disclaimer, the term of this patent is extended or adjusted under 35 U.S.C. 154(b) by 0 days.

(21) Appl. No.: 09/605,228

(22) Filed: Jun. 28, 2000

(51) Int. Cl.[7] .............................................. H01M 10/46
(52) U.S. Cl. .......................... 307/24; 307/23; 307/66; 307/150
(58) Field of Search .......................... 307/64–66, 150, 307/24, 23

(56) References Cited

U.S. PATENT DOCUMENTS

| | | | |
|---|---|---|---|
| 3,543,119 A | | 11/1970 | Bauer et al. |
| 3,629,562 A | | 12/1971 | Davis, III et al. |
| 4,394,702 A | | 7/1983 | Boothe |
| 4,611,289 A | | 9/1986 | Coppola |
| 4,856,078 A | | 8/1989 | Konopka |
| 5,019,767 A | * | 5/1991 | Shirai et al. ................. 307/150 |
| 5,200,685 A | * | 4/1993 | Sakamoto ..................... 307/66 |
| 5,249,741 A | | 10/1993 | Bistline et al. |
| 5,287,244 A | | 2/1994 | Hileman et al. |
| 5,375,246 A | | 12/1994 | Kimura et al. |
| 5,446,905 A | | 8/1995 | Koshiishi |
| 5,526,289 A | | 6/1996 | Dinh et al. |
| 5,561,361 A | * | 10/1996 | Sengupta et al. .............. 320/14 |
| 5,687,079 A | | 11/1997 | Bauer et al. |
| 5,731,671 A | | 3/1998 | Adam et al. |
| 5,764,506 A | | 6/1998 | Eynaud |
| 5,769,705 A | | 6/1998 | O'Callaghan et al. |
| 5,784,626 A | | 7/1998 | Odaohara |
| 5,845,141 A | | 12/1998 | Massie |
| 5,845,142 A | | 12/1998 | Hayasaka |
| 5,845,150 A | | 12/1998 | Henion |
| 5,850,351 A | | 12/1998 | Lotfy et al. |
| 5,881,215 A | | 3/1999 | Alft |
| 5,898,569 A | * | 4/1999 | Bhatia ........................ 361/700 |
| 5,905,491 A | | 5/1999 | Kim |
| 5,916,313 A | | 6/1999 | Brown |
| 5,926,386 A | | 7/1999 | Ott et al. |
| 5,955,797 A | * | 9/1999 | Kim ........................... 307/150 |
| 5,974,556 A | * | 10/1999 | Jackson et al. .............. 713/322 |
| 6,003,139 A | | 12/1999 | McKenzie |
| 6,029,119 A | | 2/2000 | Atkinson |
| 6,035,358 A | | 3/2000 | Tanikawa |
| 6,037,732 A | | 3/2000 | Alfano et al. |
| 6,040,668 A | | 3/2000 | Huynh et al. |
| 6,081,425 A | * | 6/2000 | Cheng ........................ 361/704 |
| 6,307,746 B1 | * | 10/2001 | Beckman ..................... 361/687 |

* cited by examiner

Primary Examiner—Fritz Fleming
(74) Attorney, Agent, or Firm—John S. Christopher

(57) ABSTRACT

An electronic power supply for use with a personal computer exhibits a construction including an external power section located exterior to a personal computer and including a direct current voltage source in combination with a battery source for providing a load adjusted direct current voltage. A first supervisory computer is connected to the direct current voltage source and the battery source for controlling the load adjusted direct current voltage. An internal power section is located interior to the personal computer and in electrical contact with the external power section. The internal power section comprises a plurality of voltage output devices for providing a plurality of direct current output voltages. A second supervisory computer is connected to the plurality of voltage output devices for controlling the plurality of direct current output voltages distributed to the personal computer. A signal communication link exists between the second supervisory computer and the first supervisory computer.

19 Claims, 5 Drawing Sheets

ELECTRONIC POWER SUPPLY FOR PERSONAL COMPUTER AND METHOD

BACKGROUND OF THE INVENTION

1. Field of the Invention

The present invention relates to power supplies. More specifically, the present invention relates to methods and apparatus for an electronic power supply for use with a personal computer and including an external power section located exterior to the personal computer and an internal power section located interior to the personal computer, wherein both the external power section and the internal power section each include a separate supervisory computer for controlling the electronic power supply to provide optimal performance and fault correction.

2. Description of the Prior Art

The prior art is directed to methods and apparatus for power supplies used in personal computers.

The personal computer and other computing devices require an input of electrical power for energizing circuitry within the computer. Typically, the electrical input is derived from an alternating current (AC) voltage source typically referred to as house power. However, most computers require multiple direct current (DC) voltage levels to provide adequate power thereto. That portion of the computer that accepts the AC voltage input signal and performs a conversion to provide one or more DC voltage levels required for operation of the computer is known as a power supply.

Typically, prior art power supplies for personal computers include an AC voltage input signal which is applied to the primary winding of a stepdown transformer after a power switch has been actuated. The transformer typically steps-down the input AC voltage signal such as, for example, 110 VAC, single phase, 60 Hz, to provide a low voltage AC signal at the secondary winding of the transformer. The stepped-down AC voltage signal is then applied to a rectifier circuit typically comprised of a plurality of solid state diodes for converting the AC voltage at the secondary side of the transformer to a DC signal. The DC voltage signal is then applied to a capacitive filter device for smoothing the ripple in the rectified DC signal. The filtered DC signal is then further manipulated to provide one or more voltage signals at different DC voltages for use within the personal computer. Additionally, the power supply usually also includes an on-board back-up battery source and charger for providing the necessary DC voltages signals to enable operation of the personal computer during loss of AC power or when an AC source is unavailable.

The conventional device described hereinabove comprises a single power supply housed within the same cabinet as the personal computer. Certain components located within the power supply, i.e., step-down transformer, rectifier circuit, battery, battery charger and the like, are heat generating components. Thus, a problem that exists within prior art power supplies is that the heat generated by these components causes the temperature within the personal computer cabinet to increase. The increased temperature environment within the personal computer results in degraded performance and a shorted life cycle of the components within the electronic circuitry. Further, the high temperature environment necessitates the inclusion of an adequately sized cooling fan. Manufacturers of specific types of personal computers such as, for example, "Laptops", have located the stepdown transformer of the power supply within a sealed non-conductive block remote from the personal computer cabinet. However, the remaining heat generating components continue to be positioned within the personal computer cabinet.

Other problems also exist with conventional power supplies intended for use with personal computers. Typically, each manufacturer of personal computers and other computing devices tailors the design of their power supply to one specific type or model of personal computer. Thus, the power supply of any particular manufacturer of personal computers is not useful as a power supply in the personal computer of any other manufacturer. The reason is that the criteria used to design the power supply for one personal computer (i.e., voltage outputs, current levels, dimensions, weight and the like) typically will not be the same as the criteria used to design the power supply for a personal computer of another manufacturer. Thus, different power supplies designed by different manufacturers for use in personal computers are not universally useful. Another problem with conventional power supplies for use in personal computers is that they consume too much space within the personal computer. This creates a problem in an era where the emphasis is on smaller packaging of all electronic devices. An additional problem is that the signal waveforms of the input AC voltage signal become distorted as the power demand increases such as, for example, at half-load. The signal waveform distortion is even more pronounced when the power demand is at full-load. The waveform distortion caused by conventional power supplies is undesirable since it affects the waveform and performance of other electrical loads such as electrical lighting and other computer peripherals.

Thus, there is a need in the art for an electronic power supply for use with a personal computer that exhibits a design comprising an external power section and an internal power section, each of which is controlled by a supervisory computer for ensuring optimal performance, fault correction and substantial heat load reduction resulting in extended life and improved performance of electronic components, occupies less space, provides improved cooling within the personal computer cabinet, reduces the distortion of the signal waveforms of the input AC voltage when the power supply is under load, and can be employed to universally replace the singular heat generating, internal power supply of most models of personal computers.

SUMMARY OF THE INVENTION

Briefly, and in general terms, the present invention provides a new and improved electronic power supply and method therefore which is typically employed in a personal computer or other computing device for providing multiple regulated direct current (DC) voltages required by modern personal computers. Generally, the electronic power supply for use with a personal computer is comprised of an external power section located exterior to the personal computer and an internal power section located interior to the personal computer. The external power section includes the power generating (and heat generating) components while the interior power section includes the power distributing components of the electronic power supply.

In a preferred embodiment, the external power section of the electronic power supply for use with a personal computer includes a stepdown transformer, a rectifier circuit, a stand-by battery and charging circuit, a cooling fan, various instruments for monitoring system parameters and a first supervisory computer for controlling and optimizing the efficiency of the electronic power supply. A rectified DC voltage is augmented by the stand-by battery to provide an uninterruptible power source limited by the storage capacity of the stand-by battery. The augmenting of the rectified DC voltage with the stand-by battery results in minimized waveform distortion typically occurring in prior art power supplies. The resultant rectified DC voltage is then cabled from the external power section to the internal power section. The isolation of the external power section away from the personal computer removes many of the heat generating components from the computer resulting in lower operating temperatures. Consequently, the life of internal electronic components is extended enabling upgrades to higher speed processors.

The internal power section of the electronic power supply includes a plurality of high efficiency, solid state DC-to-DC buck switching converters and polarity-reversing inverters to provide individually regulated voltages required by the personal computer. The DC-to-DC buck switching converters lower and regulate individual voltages from a single DC voltage provided by the external power section of the electronic power supply. The internal power section also includes a second supervisory computer for controlling and optimizing performance and correction of faults sensed by a plurality of instruments for monitoring system parameters. Most of the power (and heat) generating components have been removed to the external power section and the high efficiency, solid state DC-to-DC buck switching converters and polarity-reversing inverters produce very little heat. Therefore, the internal power section of the electronic power supply operates in a much cooler environment compared to conventional power supplies.

The present invention is generally directed to a power supply and particularly directed to a power supply for use with a personal computer. Use of a pair of supervisory computers for controlling the external power section and the internal power section enables temperature, load-sharing, current sensing, and other monitoring/control functions to optimize the efficiency of the electronic power supply. Any of the parameter monitoring devices in either section is capable of providing an alarm signal to the first supervisory computer for interrupting the DC power provided by the external power section. The interruption of the DC power occurs by tripping, i.e., opening, a power control relay located in the external power section. The power control relay can also be opened by a signal transmitted on a communication line from the second supervisory computer in the internal power section. A Universal Serial Buss (USB) interface enables the personal computer to monitor/display fault conditions as they occur.

In its most fundamental embodiment, the electronic power supply for use with a personal computer exhibits a construction including an external power section located exterior to a personal computer and including a direct current voltage source in combination with a battery source for providing a load adjusted direct current source. A first supervisory computer is connected to the direct current voltage source and the battery source for controlling the load adjusted direct current voltage. An internal power section is located interior to the personal computer and in electrical contact with the external power section. The internal power section comprises a plurality of voltage output devices for providing a plurality of direct current output voltages. A second supervisory computer is connected to the plurality of voltage output devices for controlling the plurality of direct current output voltages distributed to the personal computer. A signal communication link exists between the second supervisory computer and the first supervisory computer.

These and other objects and advantages of the present invention will become apparent from the following more detailed description, taken in conjunction with the accompanying drawings which illustrate the invention, by way of example.

DESCRIPTION OF THE INVENTION

Figure 1:
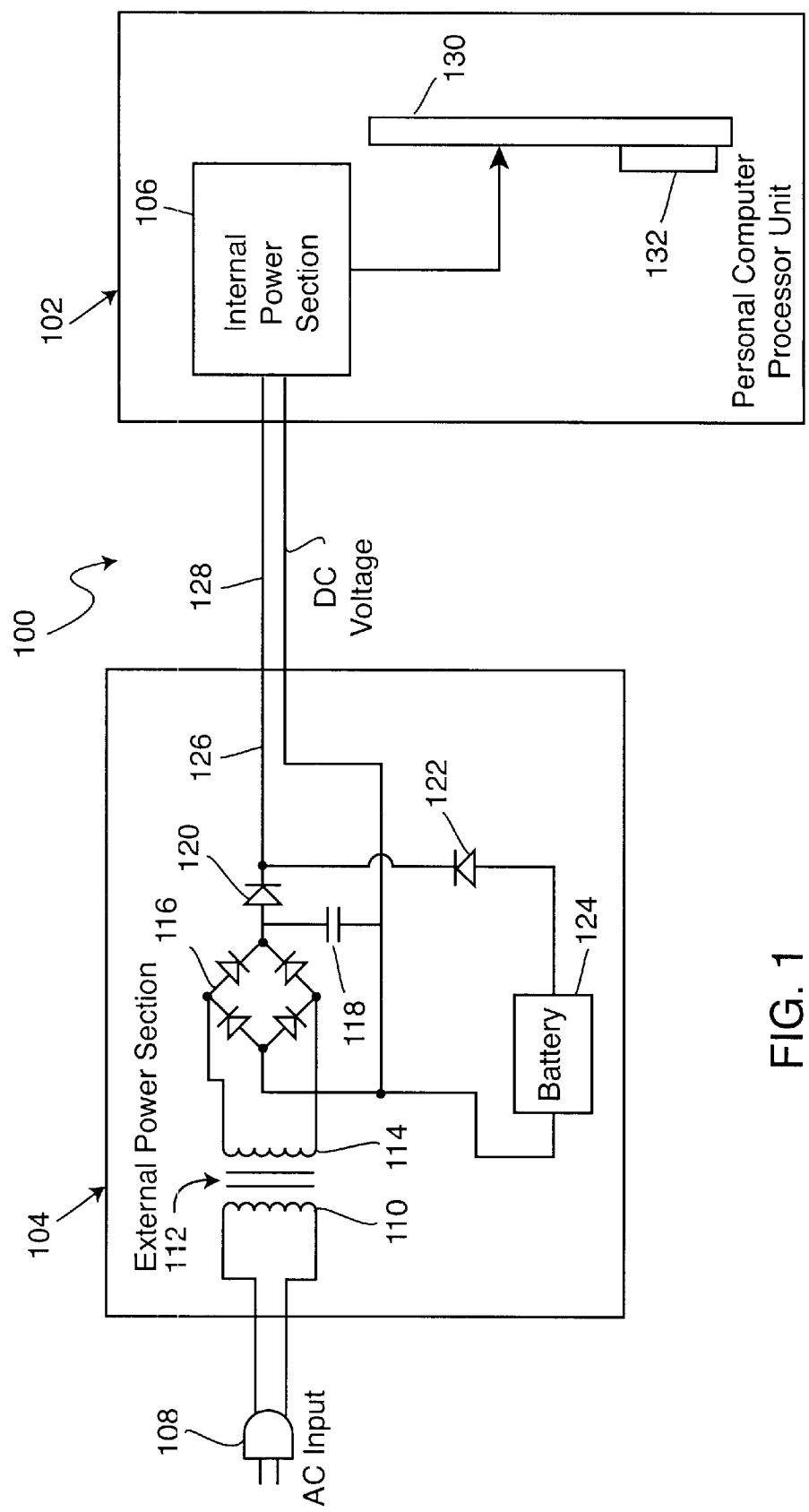
FIG. 1 is a general block diagram of a processor unit of a personal computer system showing an electronic power supply of the present invention including an external power section that converts alternating current (AC) voltage to direct current (DC) voltage which is then cabled to an internal power section located within the personal computer processor unit.
Figure 2:
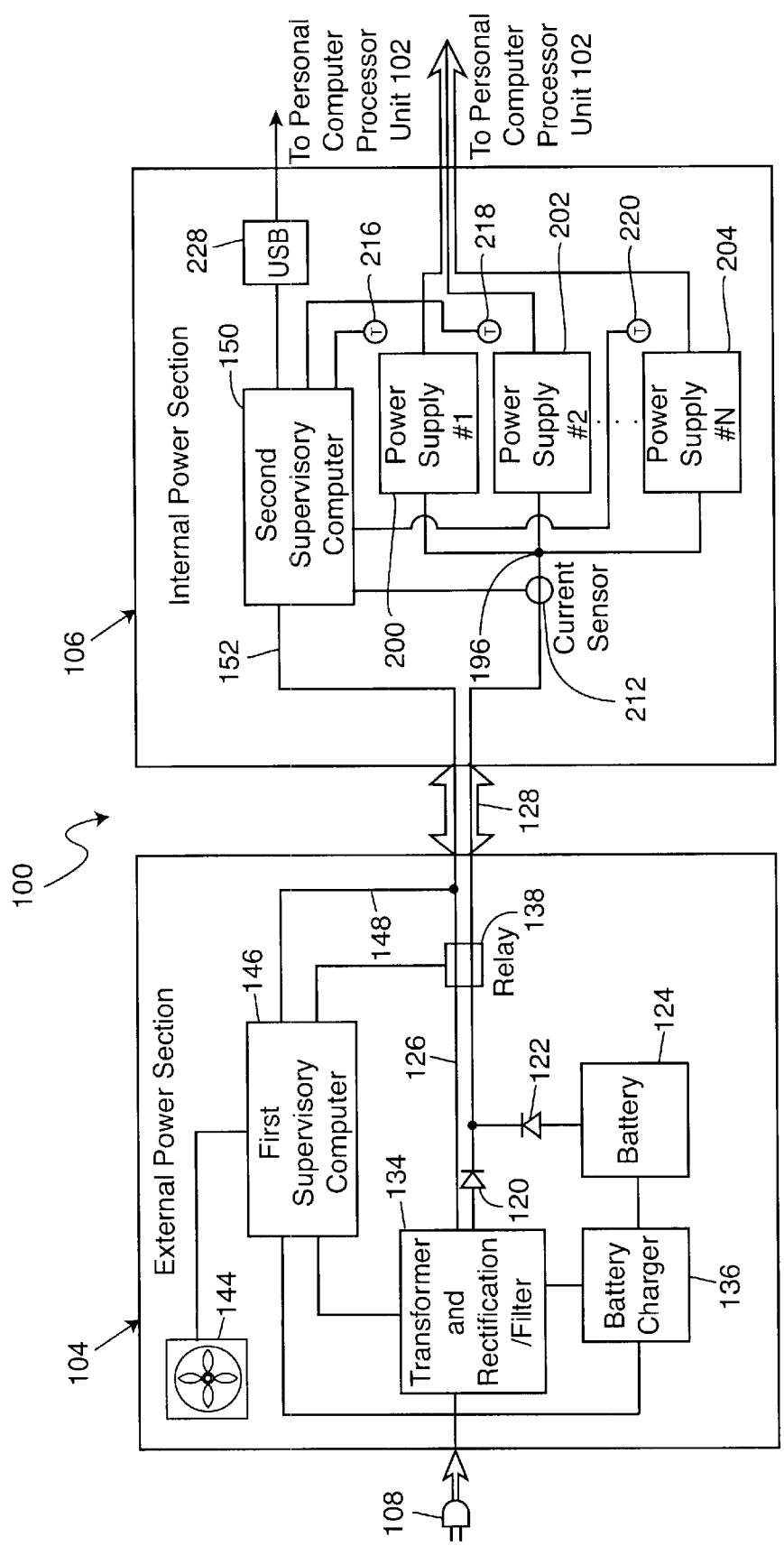
FIG. 2 is a general block diagram of the electronic power supply of the present invention showing the external power section which includes the power generating components under the control of a first supervisory computer, and showing the internal power section which includes the power distributing components under the control of a second supervisory computer.

The present invention is an electronic power supply 100 for use in a processing unit 102 of a personal computer having an external power section 104 and an internal power section 106 best shown in FIGS. 1 and 2. It is emphasized that the external power section 104 is located exterior to or remote from the personal computer processor unit 102. Likewise, the internal power section 106 is located within the personal computer processor unit 102. The external power section 104 and the internal power section 106 are each shown in relation to the personal computer processing unit 102 in FIG. 1.

In general, an alternating current (AC) input voltage typically 110 volt AC is applied to the external power section 104 via a standard electrical plug 108 as shown in FIG. 1. The external power section 104 is located remote from the personal computer processor unit 102. The AC input voltage energizes the primary winding 110 of a transformer 112 which steps down the voltage to approximately 20 volts AC at a secondary winding 114. The 20 volts AC is then applied to a standard full-wave rectified circuit 116 connected across the second winding 114. The output of the rectifier circuit 116 is a rectified direct current (DC) voltage. A filter capacitor 118 is connected across the rectifier circuit 116 to smooth the ripple in the rectified DC voltage to provide a rectified and filtered DC voltage. The output of the rectifier circuit 116 is intercepted by a first blocking diode 120 as is shown in FIGS. 1–3.

Figure 3:
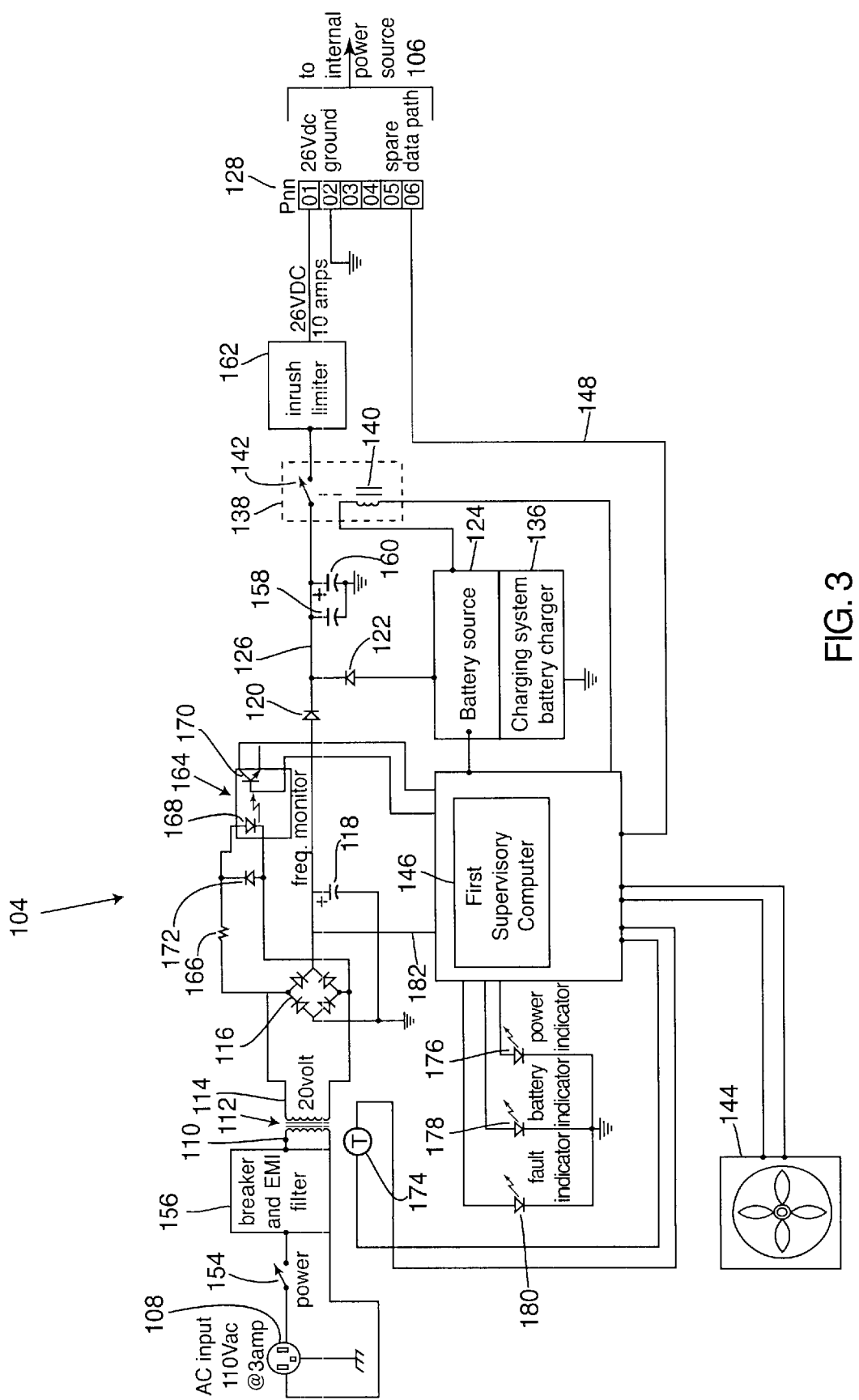
FIG. 3 is a detailed schematic diagram of the external power section of the electronic power supply of the present invention showing the power generating components including a transformer, rectifier and battery source and also the first supervisory computer.

Also connected across the rectifier circuit 116 is a second blocking diode 122 in series with a battery source 124 where the second blocking diode 122 opposes the first blocking diode 120 as shown in FIGS. 1–3. The battery source 124 serves two functions. Loss of the DC voltage input signals to a personal computer will result in malfunction of or damage to the personal computer. Therefore, the battery source 124 initially serves as a standby power supply in case of loss of the AC input voltage or loss of the rectified and filtered DC voltage. In addition, the DC voltage of the battery source 124 is intermixed with the rectified and filtered DC voltage permitting the utilization of a smaller filter capacitor 118 having a shorter charging time. The combination of the filter capacitor 118 and the opposing first and second blocking diodes 120, 122, respectively, enables the battery source 124 to be intermixed with the rectified and filtered DC voltage to provide a load adjusted DC voltage. When intermixed under half-load and full-load conditions, the rectified and filtered DC voltage shares the load current with the battery source 124. This sharing results in a load adjustment of the DC voltage. Further, this circuit arrangement also provides for a partial power factor correction in the AC input voltage resulting in less distortion of the AC input voltage waveform and consequently less of a negative effective (caused by voltage dip) on other electrical loads such as electrical lighting and computer peripherals. This feature of the present invention will be described in more detail hereinbelow with reference to FIGS. 5 and 6.

The load adjusted DC voltage (indicated at point 126 on FIG. 3) generated by the external power section 104 is then transmitted via a cable interconnect 128 to the internal power section 106 best shown in FIGS. 1 and 2. The internal power section 106 is located within the personal computer processor unit 102 as is shown in FIG. 1. In general, the function of the internal power section 106 is to convert the load adjusted DC voltage (i.e., a single DC voltage) into a plurality of DC output voltages utilizing high efficiency, solid state devices. These solid state devices will be disclosed in more detail during the discussion of FIG. 4. Each of the DC voltages generated by the internal power section 106 is required for the proper operation of the personal computer processor unit 102. The internal power section 106 is shown in FIG. 1 to be in electrical contact with a personal computer (circuit) board 130 also normally referred to as a "mother board". Mounted upon the personal computer (circuit) board 130 is a processor chip 132 which is typically referred to as a "host computer". The processor chip 132 can control the functions of the external power section 104 and the internal power section 106 as will be discussed in more detail hereinbelow.

Additional structural detail in block form of the electronic power supply 100 can be seen by referring to FIG. 2. The external power section 104 and the internal power supply 106 are shown physically connected by the cable interconnect 128 in FIG. 2. It is again emphasized that the external power section 104 is located outside of, i.e., remote from, the personal computer processor unit 102 while the internal power section 106 is located within the personal computer processor unit 102. It is further noted that the main power generating components of the electronic power supply 100 are incorporated within the external power section 104. The major portion of the heat associated with a power supply is generated by the main power generating components. Consequently, the main heat generating components of the electronic power supply 100 of the present invention are located exterior to, i.e., remote from, the personal computer processor unit 102 as is shown in FIG. 1. Consequently, the personal computer (circuit) board 130 and the processor chip 132 are not exposed to the heat generated by the main power generating components. Further, since the internal power section 106 utilizes high efficiency, solid state devices which are low heat generating devices, the electronic components located within the personal computer processor unit 102 exhibit improved performance and a longer life cycle.

The block diagram of FIG. 2 shows the standard electrical plug 108 for providing the external power section 104 of the electronic power supply 100 with 110 volt, single phase, 60 Hz power. It is noted that copies of the electronic power supply 100 intended for use in overseas countries will be fitted with equipment functional at other than 60 Hz power. The main power generating components such as the transformer 112, the full-wave rectifier circuit 116, and the filter capacitor 118 which are clearly shown in FIGS. 1 and 3 are shown in a block 134 in FIG. 2 for simplification. Connected to the power generating components block 134 is a battery charger 136 which when energized is employed to maintain the electrical charge in the battery source 124. The battery charger 136 employs the rectified DC voltage downstream of the rectification circuit 116 (approximately 28 volts DC) to charge the battery source 124 which typically is rated at a 2.0+ amp hour charge. The power generating components shown in block 134 are separated from the battery source 124 by the opposing first and second blocking diodes 120 and 122 as shown in FIGS. 1–3. The blocking diodes 120 and 122 serve to isolate the transformer 112, rectification circuit 116 and filter capacitor 118 from the battery source 124. The power generating components located within block 134 shown in FIG. 2 can only communicate with the battery source 124 through the battery charger 136.

The external power section 104 also includes a power control relay 138 as shown in FIGS. 2 and 3. The function of the power control relay 138 is to automatically interrupt the load adjusted DC voltage at point 126 (see FIGS. 2 and 3) under emergency conditions or upon receipt of a shutdown command from the personal computer processor unit 102. The power control relay 138 is energized from the battery source 124 as is shown in FIG. 3 to ensure power availability during an emergency condition. Although the power control relay 138 is shown as a box in FIG. 2, a magnetic coil 140 and contacts 142 are shown in FIG. 3. The relay 138 is an electromagnetic device that operates mechanical relay contacts. The mechanical relay 138 has been chosen for use in this application over a solid state device to ensure a complete isolation of DC power to avoid the possibility of inadvertent shorting of a semi-conductor device or inadvertent energizing of a device by the transmission of DC voltage.

If certain fault or emergency conditions exist, the relay 138 will be deenergized resulting in an interruption in the delivery of the DC voltage to the internal power section 106. Examples of fault or emergency conditions include situations involving low battery voltage and high temperature levels within the external power section 104. Additionally, the monitored parameters of low voltage, high temperature, current levels in the internal power section 106 and disconnection of the cable interconnect 128 will result in the opening of the power control relay 138 and interruption of the DC voltage. The external power section 104 also includes a cooling fan 144 utilized to provide ventilation to the power generating components located within block 134 as shown in FIG. 2 which include the transformer 112, rectifier circuit 116 and filter capacitor 118.

Each of the components of the external power section 104 including the power generating components located within the block 134, battery 124 and battery charger 136, power control relay 138 and the cooling fan 144 is controlled by a first supervisory computer 146 as shown in FIGS. 2 and 3. The first supervisory computer 146 is also connected via a data communication line 148 and the cable interconnect 128 to a second supervisory computer 150 via a data communication line 152 in the internal power section 106 shown in FIGS. 2 and 3. The data communication lines 148 and 152 enable the first supervisory computer 146 and the second supervisory computer 150 to communicate. Each of the first and second supervisory computers 146 and 150, respectively, is a miniature integrated computer located on a microchip and each is available commercially from multiple integrated circuit manufacturers in the Silicon Valley area of Northern California.

The first supervisory computer 146 of the external power section 104 serves to monitor and control (a) the AC input voltage to detect waveform deformation, (b) the internal temperature particularly that of transformer 112, (c) the battery charger 136, (d) the relay 138 to limit the inrush current when the external power section 104 is initially energized by interrupting the load adjusted DC voltage until the cable interconnect 128 is fully plugged-in, and (e) the cooling fan 144. Additionally, data is constantly transmitted across the data communication lines 148 and 152, respectively, for controlling the operation of components in both the external power section 104 and the internal power section 106.

The cable interconnect 128 connects the external power section 104 to the internal power section 106. The cable interconnect 128 is typically a multi-strand, multi-wire cable of approximately six feet in length. The connection between the external power section 104 and the cable interconnect 128 is usually hardwired while the connection between cable interconnect 128 and the internal power section 106 typically employs a receptacle type plug 153 indicated in FIG. 4. For example, the end of the cable interconnect 128 will have a receptacle and the interior power supply will have a pair of prongs (not shown) for interfacing with the receptacle at the end of the cable interconnect 128. The cable interconnect 128 may comprise a plastic tubular cover for serving as a conduit for DC voltage lines and the data communications 148 and 152 as shown in FIG. 2.

Further comments concerning the external power section 104 shown in FIG. 3 will now be made prior to discussing the internal power section 106 in more detail. A manual power switch 154 is provided which serves as an on-off switch and as a local disconnect for the electrical power. A breaker and EMI filter 156 is connected across the primary winding 110 of the transformer 112 as shown in FIG. 3. The breaker portion will typically be an automatic resetting fuse such as a bi-metallic type that separates under excessive heat. The electromagnetic interference (EMI) filter portion of the breaker and EMI filter 156 is typically a conventional coil filter for shunting high frequency noise traveling in either direction in the external power section 104 to electrical ground. Additionally, a pair of capacitor filters 158 and 160 are connected in parallel for shunting to electrical ground any high frequency signals superimposed upon the load adjusted DC voltage. An inrush limiter 162 is comprised of a negative temperature coefficient resistor which cooperates with the power control relay 138. When the power control relay 138 closes, power-on arcing is experienced. The resistance of the inrush limiter 162 is inversely proportional to the increasing magnitude of the current from the power-on arcing. As the current from the power-on arcing increases, the resistance of the inrush limiter 162 is reduced. This action reduces the effects of the current associated with the power-on arcing on the personal computer processing unit 102.

A frequency monitor 164 is comprised of an optically-coupled frequency and waveform distortion sensor which is energized directly off of the AC side of the full-wave bridge rectifier 116 as is shown in FIG. 3. A current limiting resistor 166 is included to limit the AC current to the frequency monitor 164. A light emitting diode LED 168 is employed to generate light energy of a certain frequency. An optical phototransistor 170 is responsive to the frequency and the amplitude of the light energy emitted by the LED 168. The frequency of the light energy causes the phototransistor 170 to energize but the amplitude of the light energy determines the amount of conduction by the phototransistor 170. A high amplitude of the light energy from the LED 168 indicates that wave distortion has occurred in the AC input signal and in the frequency of the AC input signal. A shorting diode 172 is placed across the LED 168 for redirecting the current flow away from the LED 168 in case of excessive AC current flow.

The conduction of the phototransistor 170 is monitored by the first supervisory computer 146 to determine if the electrical load in the internal power section 106 should be adjusted. It is the data shared between the first supervisory computer 146 and the second supervisory computer 150 on data communication lines 148 and 152 that enables the monitoring and adjusting of electrical loads across the cable interconnect 128. As a result, the second supervisory computer 150 analyzes the situation and signals the first supervisory computer 146 as to whether the battery charger 136 should be deenergized or placed in a low charging mode. Likewise, a thermal sensor 174 is utilized to monitor the temperature within the transformer 112. As a result, the first supervisory computer 146 can adjust the speed of the cooling fan 144 accordingly. Additionally, the first supervisory computer 146 includes a plurality of status indicator lights. A power indicator light 176 when lit indicates that the AC input power is switched on. When lamp 176 is unlit, AC input power is unavailable and the electronic power supply 100 is on the power of the battery source 124. The battery indicator light 178 when green indicates that the battery source 124 is adequately charged and when red, indicates that the battery source 124 is discharged or inoperative. The fault indicator light 180 when lit indicates that an unidentified problem exists which typically indicates that the power control relay 138 has been deenergized when the AC power was applied to the external power section.

The first supervisory computer 146 and the second supervisory computer 150 are each digital devices. The parameter sensors on the DC voltage line are analog in nature and thus the first and second supervisory computers 146 and 150, respectively, must include an analog-to-digital (A/D) converter (not shown) in order to process the readings on the various parameters. The output of the rectifier circuit 116 is connected to the first supervisory computer 146 on a sensor line 182 as is shown in FIG. 3. Thus, the sensor line 182 provides the first supervisory computer 146 with the value of the rectified DC voltage. This rectified DC voltage at the output of the rectifier circuit 116 is compared with the voltage level of the battery source 124 in the first supervisory computer 146. This process is utilized in the intermixing of the rectified and filtered DC voltage and the DC voltage of the battery source 124.

Figure 5A:
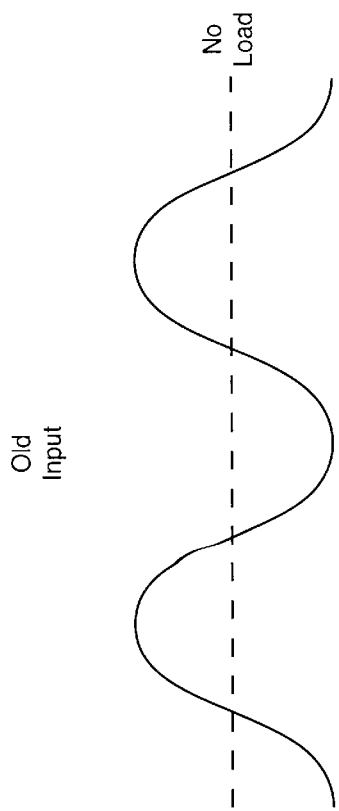
FIG. 5 (FIGS. 5A–C) shows electronic waveforms measured on the secondary side of an input transformer in a conventional power supply of the prior art, the waveforms being viewed at no-load, half-load and full-load.
Figure 5B:
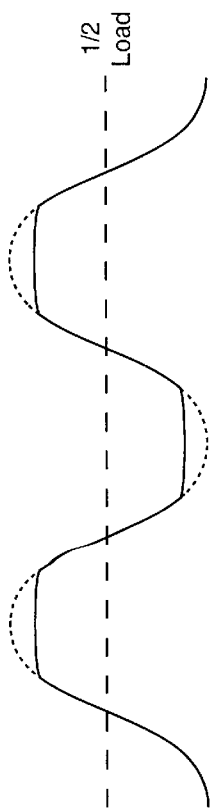
Figure 5C:
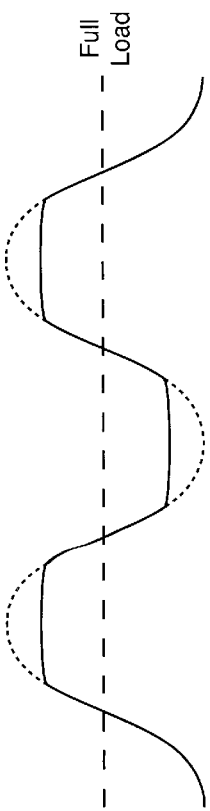

Conventional power supplies include an AC input voltage, a stepdown transformer, a rectifier circuit and a large filter capacitor. At no-load, the large filter capacitor will charge to essentially the same value as the AC voltage appearing across the secondary side of the stepdown transformer. This situation is illustrated by FIG. 5A which shows an undistorted sine wave. When the power supply is partially loaded, the large filter capacitor will be charged to a value less than the AC voltage across the secondary side of the transformer. When the AC voltage on the secondary side of the transformer is greater than the charge on the large filter capacitor, the capacitor will draw current from the secondary side of the transformer 112. This action results in distortion of the AC waveform on the secondary side of the transformer which is illustrated in FIG. 5B at half-load, and in FIG. 5C at full load. The waveform distortion is illustrated by the flattening of the tops of the sine waves. This AC waveform distortion is undesirable because it affects the waveform and performance of other electrical loads such as lighting and computer peripherals (due to less than available peak voltage from the AC power source).

In the electronic power supply 100 of the present invention, electrical loads are transitory (i.e., not always on) and short lived. The battery source 124 including the first blocking capacitor 120 and the second blocking capacitor 122 is configured to supplement the rectified and filtered DC voltage at the output of the rectifier circuit 116 as shown in FIG. 3. Thus, the battery source 124 is available to apply voltage across the filter capacitor 118 so that the filter capacitor 118 will draw current from the battery source 124. Thus, the voltage across the filter capacitor 118 will not drop below the voltage of the battery source 124. Because of this fact, the filter capacitor 118 shown in FIG. 3 can be made smaller. At no-load, the smaller filter capacitor 118 will charge to the same value as the AC voltage appearing across the secondary winding 114 of the transformer 112.

Figure 6A:
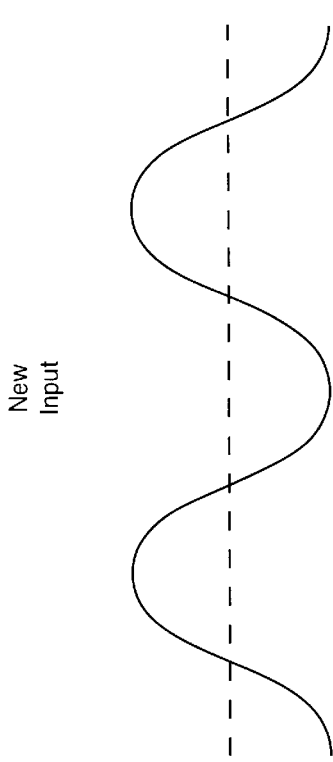
FIG. 6 (FIGS. 6A–C) shows electronic waveforms measured on the secondary side of the input transformer in the external power section of the electronic power supply of the present invention, the waveforms being viewed at no-load, half-load and full-load.
Figure 6B:
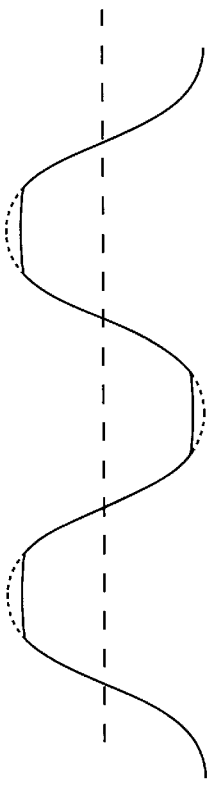
Figure 6C:
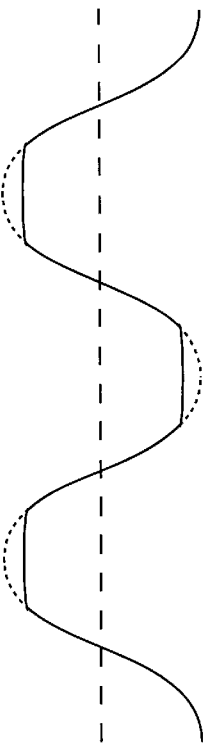

Because the filter capacitor 118 is smaller, its time constant is smaller resulting in a shorter charging time. This situation is illustrated in FIG. 6A which shows an undistorted sine wave. As the load on the external power section 104 increases, the voltage across the smaller filter capacitor 118 varies. However, the voltage across the filter capacitor 118 remains relatively fixed because of the constant presence of the battery source 124. This configuration results in minimal wave distortion in the AC input voltage with a corresponding minimal effect on the adjacent electrical loads. This situation is illustrated in FIG. 6B at half-load and in FIG. 6C at full load. Thus, use of the battery source 124 to supplement the rectified and filtered DC voltage to provide the load adjusted DC voltage keeps the voltage across the filter capacitor 118 from dropping below the voltage level of the battery source 124. Consequently, the creation of the load adjusted DC voltage results in an AC input voltage having an adjusted power factor.

Figure 4:
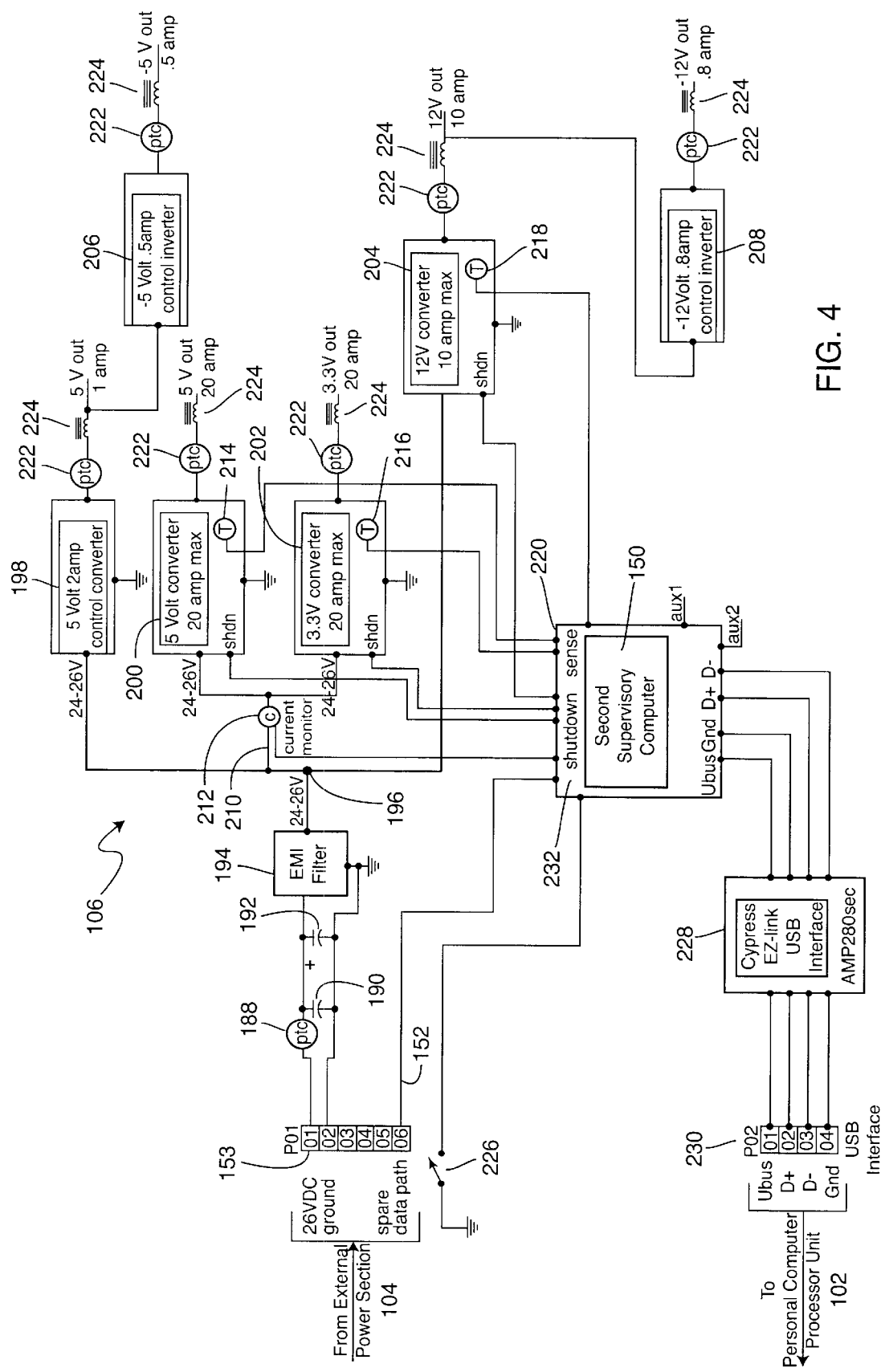
FIG. 4 is a detailed schematic diagram of the internal power section of the electronic power supply of the present invention showing the power distributing components including a plurality of converters and inverters and also the second supervisory computer.

We now turn our attention to the internal power section 106 of the electronic power supply 100 as is illustrated in FIGS. 2 and 4. The internal power section 106 receives the load adjusted DC voltage provided by the external power section 104 at the receptacle type plug 153 shown in FIG. 4. Located in the input line connected to the receptacle type plug 153 is a positive temperature coefficient fuse 188. Fuse 188 is a self-resetting solid state device that acts like a bimetallic fuse in that increased current flow causes heating. The heat alters the resistive characteristics by increasing the resistance to the electrical current flow. At a certain resistance, the heat will be adequate to open the fuse 188 to protect the electronic components downstream. After cooling, the fuse 188 will reset itself. A pair of parallel positioned capacitor filters comprised of a capacitor 190 and a capacitor 192 function to shunt electrical noise to ground. The capacitors 190 and 192 prevent electrical noise from entering the internal power section 106 and causing a malfunction of the various solid state converters and inverters located therein. Likewise, the capacitors 190 and 192 also prevent the passage of interference back to the external power section 104. Thus, the capacitors 190 and 192 function to isolate any electrical noise.

An electromagnetic interference EMI filter 194 is located in the input line and is also connected to electrical ground as is shown in FIG. 4. The EMI filter 194 is typically a conventional coil filter for shunting high frequency noise traveling in either direction in the internal power section 106 to electrical ground. Downstream of the EMI filter 194 is a main junction point 196 which receives the load adjusted DC voltage within the range of (24–26) volts DC. Each of a plurality of solid state DC voltage output devices draw power from the main junction point 196. The plurality of solid state voltage output devices are DC power supplies which include, for example, a 5 volt, 2 amp control converter 198, a 5 volt, 20 amp converter 200, a 3.3 volt, 20 amp converter 202, and a 12 volt, 10 amp converter 204 as shown in FIG. 4. Three of these converters, for example, 200, 202 and 204 are represented as power supplies in the generalized block diagram of FIG. 2. In addition, extending from the 5 volt, 2 amp control converter 198 is a −5 volt, 0.5 amp control inverter 206 and extending from the 12 volt, 10 amp converter 204 is a −12 volt, 0.8 amp control inverter 208.

Each of the solid state DC voltage output devices is connected to the main junction point 196 via a separate conductor line. Buck switching converter 200 and buck switching converter 202 are each large (20 amp) DC voltage output devices and are each connected to a conductor line 210 as is shown in FIG. 4. Thus, conductor line 210 carries the most amperage and consequently is fitted with a current sensor or monitor 212 as is shown in FIGS. 2 and 4. The current monitor 212 includes a coil loop (not shown) wrapped about the conductor line 210. The electrical current flowing through conductor line 210 induces a voltage in the coil loop which can be sensed by an instrument. Thus, the more current flowing through conductor line 210, the greater the indication.

The current monitor 212 is connected to and is monitored by the second supervisory computer 150 shown in FIGS. 2 and 4. Thus, an overcurrent condition in conductor line 210 can result in the de-energizing of power control relay 138 and an interruption of the load adjusted DC voltage in the external power section 104. This action could result from, for example, an overcurrent emergency signal instruction from the second supervisory computer 150 to the first supervisory computer 146 along data communication lines 148 and 152, respectively. The first supervisory computer 146 would then de-energize the relay magnetic coil 140 of the power control relay 138 interrupting the load adjusted DC voltage. A maximum power parameter can also be set at, for example, 130 watts in the second supervisory computer 150. A reading of the rectified DC voltage is obtained on line 182 by the first supervisory computer 146 in the external power section 104. Likewise, a reading of the current level is obtained from the current monitor 212 by the second supervisory compute 150. The product of the DC current and DC voltage readings provides the DC power. Thus, a maximum power trip can be set to protect the electronic power supply 100 from an overload condition.

The monitoring of system parameters and the de-energizing of the power control relay 138 in an emergency situation as described in the immediately preceding paragraph is the normal operating procedure for the present invention. Each of the DC voltage output devices including converters 200, 202 and 204, respectively, include a temperature or thermal sensor 214, 216 and 218 as is shown in FIGS. 2 and 4. Each of the temperature or thermal sensors 214, 216 and 218 are connected to a sense terminal 220 on the second supervisory computer 150 and thus is constantly monitored. The monitoring data sensed by the second supervisory computer 150 is transmitted to the first supervisory computer 146 via data communication lines 148 and 152, respectively. The first supervisory computer 146 controls the power control relay 138.

When each of the DC voltage output devices, i.e., converters 198, 200, 202, 204 and inverters 206 and 208, is initially energized, the inrush current is maximum. Thus, the effect on the local lighting circuits and computer peripherals is obvious because of the voltage dip. If all of the DC voltage output devices were initially energize simultaneously, the summation of the inrush current would result in the tripping of circuit breakers and other current sensing devices and distortion of the AC input voltage in the external power section 104. Thus, one of the main functions of the second supervisory computer 150 is to control and monitor the starting sequence of the buck switching converters 198, 200, 202 and 204. By adopting a "power-on sequencing procedure", the maximum amplitude of instantaneous inrush current can be distributed over time and thus controlled. Thus, the initial powering-on of the buck switching converters 198, 200, 202 and 204 are staggered over time. This procedure can be, for example, software controlled by the personal computer processing unit 102 in a customized start-up sequence.

A general description of the different types of DC voltage output devices will now be provided. A converter, also known as a buck switching converter, is an off-the-shelf item that is available from several major electronic manufacturing companies such as National Semiconductor and Maxim Company, both located in San Jose, Calif. A buck switching converter is a DC solid state device that converts a DC positive voltage at a greater potential to a DC positive voltage at a lower potential, i.e., to a specified lower regulated output. This is accomplished by a pulse width modulation procedure wherein a signal with a fixed load at a fixed high frequency (300 KHz) will produce a set voltage. As the load increases, the pulse width modulation is adjusted to hold the output voltage constant. Each of the buck switching converters 198, 200, 202 and 204 operates in this manner. An inverter is an off-the-shelf item that includes a microchip including a series of passive RLC components which manipulates a positive voltage for inverting it to a regulated output voltage of opposite polarity. Inverters are also available from National Semiconductor and Maxim Company in San Jose, Calif. Each of the converters 198, 200, 202 and 204 and each of the inverters 206 and 208 include an integrated circuit including passive RLC components. It is the placement of the RLC components that distinguishes a converter from an inverter.

Both converters and inverters are utilized in the internal power section 106 of the electronic power supply 100 to provide a plurality of DC output voltages of different polarities and amplitudes for use in the personal computer processing unit 102. For example, the 5 volt, 2 amp control converter 198 provides a voltage source for the power-on switch 154 and the peripheral indicators 176, 178 and 180. The 5 volt, 20 amp converter 200 provides a voltage source for Random Access Memory, peripherals and floppy diskette. The 3.3 volt, 20 amp converter 202 provides a voltage source for the processor chip 132. The 12 volt, 10 amp converter 204 provides a voltage source for a monitor and disk drive. The −5 volt, 0.5 amp control inverter provides a voltage source for miscellaneous items. Finally, the −12 volt, 0.8 amp inverter provides a voltage source for memory and floppy diskette. Each of these DC output voltages is for a different voltage requirement, all within the structure of the personal computer processing unit 102.

The output of each of the converters 198, 200, 202 and 204 and each of the inverters 206 and 208 includes a positive temperature coefficient fuse 222 and a chock coil 224 in series as shown in FIG. 4. Each of the positive temperature coefficient fuses 222 is duplicate in description and function to the positive temperature coefficient fuse 188 previously described on page 18 hereinabove. Each of the chock coils 224 is a low pass filter for suppressing high frequencies signals, i.e., to suppress the residual buzz created in the respective converters 198, 200, 202 and 204 and inverters 206 and 208.

Another safety item has been incorporated into the present invention in the form of a connector switch 226 as shown in FIG. 4. The connector switch 226 is a manually operated switch, i.e., by operation of the receptacle type plug 153 or other suitable connector associated with the cable interconnect 128. The connector switch 226 is mechanically built into the receptacle type plug 153 or other suitable connector associated with the cable interconnect 128. When the receptacle type plug 153 is fully seated, i.e., plugged in, the connector switch 226 will be closed. After the connector switch 226 is closed, the second supervisory computer 150 conducts internal diagnostic tests in the internal power section 106 and thereafter communicates with the first supervisory computer 146 to ensure that all parameters are acceptable prior to energizing the electronic power supply 100. If the receptacle type plug 153 is not fully seated, then the connector switch 226 is not closed. Thus, electrical power cannot be inadvertently applied from the external power section 104 to the internal power section 106 before the internal power section 106 is properly connected by the cable interconnect 128. This prevents electric power from being applied to the internal power section 104 before the diagnostic tests have been completed.

In addition to monitoring other parameters, the internal power section 106 includes a Universal Serial Buss (USB) interface 228 and terminal block 230 as is shown in FIGS. 2 and 4. The USB interface 228 is in signal communication with the personal computer processing unit 102 and is associated with an automatic "shutdown" procedure. When activated, the personal computer processing unit 102 performs a "shutdown" procedure on the personal computer (motherboard) board 130. It is noted that each of the converters 200, 202 and 204 and the current monitor 212 is connected to a shutdown terminal 232 on the second supervisory computer 150. These connections to the "shutdown" terminal 232 facilitates the de-energizing of each of these components. Upon receipt of the shutdown signal from the personal computer processing unit 102 via the USB interface 228, the second supervisory computer 150 commences to de-energize selected loads. The second supervisory computer 150 then communicates the shutdown signal to the first supervisory computer 146 to perform the identical shutdown procedure.

It is noted that the present invention could incorporate a software program into the present design as disclosed herein that performs separate useful tasks and functions. The useful tasks and functions could include direct communication of all parameters (i.e., temperature, voltage, current, AC waveform distortion and the like) to the processing chip 132 located in the personal computer processing unit 102. Thereafter, the software program could instruct the processor chip 132 to transfer those peripherals that are not currently being utilized into a lower power consuming mode.

The present invention provides novel advantages over other power supplies utilized in personal computers known in the prior art. A main advantage of the electronic power supply 100 of the present invention is that this design substantially reduces the heat load so that the performance and life cycle of computer components is both improved and extended, respectively. This advantage exists since the main power generating (and thus heat generating) components are moved out of the personal computer housing to an external power section 104. Further, high efficiency, solid state, low heat producing converters and inverters are utilized in the internal power section 106 for providing multiple D.C. output voltages for use in the personal computer. An additional advantage is that waveform distortion of the input AC power signal is limited by the intermix of the rectified and filtered DC voltage and the voltage of the battery source 124. The power supply design of the present invention enables incorporating a smaller filter capacitor 118 in the rectification circuit 116 augmented by the battery source 124. The first supervisory computer 146 monitors waveform distortion and adjusts the electrical load to minimize distortion in the AC input voltage. A further advantage is that the plurality of system parameters (including temperature, voltage and current levels) are monitored by the first supervisory computer 146 and the second supervisory computer 150 for identifying an emergency condition. The first supervisory computer 146 can then de-energize the power control relay 138 for interrupting the load adjusted DC voltage signal transmitted to the internal power section 106.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention. Accordingly,

What is claimed is:

1. An electronic power supply for use with a personal computer comprising:

an external power section located exterior to a personal computer and including an alternating current input signal processed to provide a direct current voltage source which simultaneously operates with a battery source for providing a load adjusted direct current voltage which results in minimal waveform distortion in said input signal;

a frequency monitor located within said external power section for providing a signal indicating the frequency and amplitude of a waveform of said input signal including waveform distortion;

a first supervisory computer connected to said direct current voltage source and said battery source and said frequency monitor for constantly monitoring and controlling said load adjusted direct current voltage and waveform distortion of said input signal;

an internal power section located interior to said personal computer and in electrical contact with said external power section, said internal power section comprising a plurality of voltage output devices for providing a plurality of direct current output voltages;

a second supervisory computer connected to said plurality of voltage output devices for constantly monitoring and controlling said plurality of direct current output voltages to said personal computer; and a data communication line for connecting said first supervisory computer to said second supervisory computer for constantly transmitting data across said data communication line for providing constant control of said internal power section to minimize waveform distortion in said input signal.

2. The electronic power supply of claim 1 wherein said direct current voltage source is comprised of a step-down voltage transformer, a full-wave bridge rectifier and a filter capacitor.

3. The electronic power supply of claim 1 wherein said first supervisory computer comprises an integrated circuit.

4. The electronic power supply of claim 1 wherein said plurality of voltage output devices each comprise a high efficiency, integrated circuit in combination with a plurality of passive electrical elements.

5. The electronic power supply of claim 1 wherein said plurality of voltage output devices comprise a buck switching converter which converts a higher direct current voltage to a lower direct current voltage.

6. The electronic power supply of claim 1 wherein said plurality of voltage output devices comprise an inverter for inverting one of said direct current output voltages to a regulated direct current output voltage of opposite polarity.

7. The electronic power supply of claim 1 wherein said second supervisory computer comprises an integrated circuit.

8. The electronic power supply of claim 1 wherein said first supervisory computer is connected to said second supervisory computer by an electrical conductor for providing said data communication line.

9. The electronic power supply of claim 1 further including a filter capacitor and a pair of opposing blocking diodes for connecting said battery source to said direct current voltage source for providing said load adjusted direct current voltage.

10. The electronic power supply of claim 1 further including a battery charger for charging said battery source.

11. The electronic power supply of claim 1 further including a power control relay controlled by said first supervisory computer for interrupting said load adjusted direct current voltage provided by said external power section.

12. The electronic power supply of claim 1 further including a plurality of parameter sensing devices for indicating an emergency condition, said parameter sensing devices being monitored by said first supervisory computer and said second supervisory computer.

13. The electronic power supply of claim 1 further including an inrush limiter for suppressing electrical arcing caused by energizing said external power section.

14. The electronic power supply of claim 1 further including an electrical fan controlled by said first supervisory computer.

15. The electronic power supply of claim 1 further including an electronic magnetic interference filter for blocking high frequency interference signals.

16. The electronic power supply of claim 1 further including a universal serial buss interface for providing communication between a personal computer processor unit and said second supervisory computer for interrupting electrical power.

17. The electronic power supply of claim 1 further including a cable interconnect having a stranded cable and a receptacle type plug for electrically connecting said external power section to said internal power section.

18. An electronic power supply for use with a personal computer comprising:

an external power section located exterior to a personal computer and including an alternating current input signal processed to provide a direct current voltage source which simultaneously operates with a battery source for providing a load adjusted direct current voltage which results in minimal waveform distortion in said input signal;

a frequency monitor located within said external power section for providing a signal indicating the frequency and amplitude of a waveform of said input signal including waveform distortion;

a first supervisory computer connected to said direct current voltage source and said battery source and said frequency monitor for constantly monitoring and controlling said load adjusted direct current voltage and waveform distortion of said input signal;

a power control relay controlled by said first supervisory computer for interrupting said direct current voltage provided by said external power section;

an internal power section located interior to said personal computer and in electrical contact with said external power section, said internal power section comprising a plurality of voltage output devices for providing a plurality of direct current output voltages;

a second supervisory computer connected to said plurality of voltage output devices for constantly monitoring and controlling said plurality of direct current output voltages to said personal computer; and a data communication line for connecting said first supervisory computer to said second supervisory computer for constantly transmitting data across said data communication line for providing constant control of said internal power section to minimize waveform distortion of said input signal.

19. An electronic power supply for use with a personal computer comprising:

an external power section located exterior to a personal computer and including an alternating current input signal processed to provide a direct current voltage source which simultaneously operates with a battery source, a filter capacitor and a pair of opposing blocking diodes for providing a load adjusted direct current voltage which results in minimal waveform distortion in said input signal;

a frequency monitor located within said external power section for providing a signal indicating the frequency and amplitude of a waveform of said input signal including waveform distortion;

a first supervisory computer connected to said direct current voltage source and said battery source and said frequency monitor for constantly monitoring and controlling said load adjusted direct current voltage and waveform distortion of said input signal;

an internal power section located interior to said personal computer and in electrical contact with said external power section, said internal power section comprising a plurality of voltage output devices for providing a plurality of direct current output voltages;

a second supervisory computer connected to said plurality of voltage output devices for constantly monitoring and controlling said plurality of direct current output voltages to said personal computer; and a data communication line for connecting said first supervisory computer to said second supervisory computer for constantly transmitting data across said data communication line for providing constant control of said internal power section to minimize waveform distortion of said input signal.

* * * * *